COMPARISON OF FINISHED BRIGHT STOCK
VISCOSITY — CARBON RESIDUE RELATIONSHIPS

FIG. 2

VISCOSITY VS VI OF DEASPHALTED OILS
PRODUCED FROM RESIDUA OF DIFFERENT
VISCOSITIES

*INVENTORS*
CHARLES A. PORTER
DONALD G. SAMUELSON
LE ROY W. HOLM
BY
ATTORNEY

FIG. 3

FINISHED BRIGHT STOCK VISCOSITY VS. V.I. (0° F. POUR)
(FOR VARIOUS PROPANE RATIOS USING DIFFERENT VISCOSITY RESIDUA)

140°F. DEASPHALTING OVERHEAD TEMP.
2.5:1 PHENOL RATIO
2% PHENOLIC WATER

FIG. 4

FINISHED BRIGHT STOCK VISCOSITY VS. V.I. (0°F. POUR)
(FOR VARIOUS PROPANE RATIOS USING DIFFERENT
VISCOSITY RESIDUA)

140° F. DEASPHALTING OVERHEAD TEMP.
4.5:1 PHENOL RATIO
2% PHENOLIC WATER

FIG. 5

FINISHED BRIGHT STOCK VISCOSITY VS V.I.(0°F. POUR)
(FOR VARIOUS PROPANE RATIOS USING DIFFERENT
VISCOSITY RESIDUA)

160°F. DEASPHALTING OVERHEAD TEMP.
2.5:1 PHENOL RATIO
2% PHENOLIC WATER

FIG. 6

FINISHED BRIGHT STOCK VISCOSITY VS. V.I. (0°F. POUR)
(FOR VARIOUS PROPANE RATIOS USING DIFFERENT VISCOSITY RESIDUA)

160° F. DEASPHALTING OVERHEAD TEMP.
4.5:1 PHENOL RATIO
2% PHENOLIC WATER

FIG. 7

DISTILLATIONS OF HIGH V.I. BRIGHT STOCK
PREPARED FROM DIFFERENT RESIDUA.

United States Patent Office 2,889,262
Patented June 2, 1959

2,889,262

PRODUCTION OF HIGHER QUALITY LUBRICATING OIL STOCKS

Charles A. Porter, Donald G. Samuelson, and Le Roy W. Holm, Crystal Lake, Ill., assignors to The Pure Oil Company, Chicago, Ill., a corporation of Ohio Application September 19, 1955, Serial No. 535,042

11 Claims. (Cl. 208—34)

This invention relates to a method of producing a maximum yield of neutral lubricating oils without affecting the quality of the finished residual lubricating oils or bright stocks. The invention also relates to a method of producing bright stocks having improved viscosity indexes as compared with conventional methods of manufacture. More specifically, the invention relates to an improved method of preparing lubricating oils by processing residues to higher viscosities followed by deasphalting under mild conditions whereby specific conditions of refining, namely, propane deasphalting, deasphalter overhead temperature and pressure, phenol-to-oil ratio and percent phenolic water, all directed to preparing 150 vis. bright stock, have been found to produce the greatest reduction in carbon residue and the highest V.I.

The present application is a continuation-in-part of an application filed by applicants on May 14, 1954, bearing Serial Number 429,976, entitled "Production of Higher Quality Lubricating Oil Stocks," now abandoned. In the aforesaid application it is shown that by removing distillable materials from residual lubricating oil fractions under reduced pressure so as to produce heavy residua having SUS viscosities above about 1800 at 210° F., following this distillation by mild deasphalting of the heavy residua, and thereafter further refining the deasphalted residua, a finished oil of 150 to 160 SUS viscosity at 210° F. having a lower carbon residue than conventional bright stock can be produced. In accordance with the present invention, it has been found that an unexpected increase in V.I. of this deasphalted residua, and subsequently of the finished lubrication oil therefrom, is obtained together with marked improvement in color, flash point and boiling range. Also, by judicious selection of refining conditions, further reduction in the carbon residue of the finished lube oils can be achieved.

It is well known that equilibrium vaporization of reduced crudes at subatmospheric pressures has been practiced for some time as one of the fundamental operations in a petroleum refinery, and is especially important in the production of lubricating oil fractions. Depending somewhat on the crude source and the depth to which the crude oil is topped in a tower at atmospheric pressure, careful consideration is given to the manner of treatment applied as concerns the viscosity index, pour points, and carbon residue values of the overhead and residue lubricating oil fractions from the vacuum distillations. It is generally recognized in this art that as the viscosities or boiling points of lubricating oil stocks (especially residual stocks) increase, their carbon residues also increase. This is recognized, for example, in the production of pale oils from South Texas distillates (Oil and Gas. Jour., Sept. 28, 1946, p. 78), and in the flash distillation of topped crudes (Ind. Engr. Chem., 44, July 1952, pp. 1624–1629), regardless of whether or not the topped crude has a high or low carbon residue level (Oil and Gas. Jour., June 17, 1948, pp. 85–90). Processes used for the subsequent treatment of these oils to further improve desirable properties, such as to increase the viscosity index and/or remove deleterious resins and asphaltic hydrocarbons, usually affect somewhat of a reduction in the carbon residue in the finished oil. Any such reduction is generally proportional to the original carbon residue of the stock treated. In the propane deasphalting of residua, for example, regardless of what the source of the residua may be, whether stepwise, batchwise, or continuous tower operation is used, or how the precipitant composition is varied, a reduction is obtained which is proportional to the carbon residue of the original feed.

By carbon residue, as used throughout the specification, is meant the percent by weight of carbonaceous residue formed after evaporation and pyrolysis of a petroleum product in accordance with the well known Ramsbottom and Conradson carbon residua tests, and ASTM method D524. These tests are intended to provide an indication of the relative coke-forming propensities of petroleum products, and are widely applied to relatively non-volatile petroleum products which partially decompose upon heating at atmospheric pressure. If any ash-forming substances are present, a content thereof in the petroleum product should be separately determined by ASTM method D482 and deducted because including the ash content gives an erroneously high carbon residue result.

It is known that as the viscosity of the residua increases due to the application of higher distillation temperatures or increased vacuum to produce more of the neutral oils, the bright stocks produced from the resulting residua have a higher carbon residue. Since the materials in residual oils or heavy distillates which break down into carbon or coke upon the application of heat are of high molecular weight, residua processed to higher viscosity contain proportionately more of these materials and would be expected to have increasingly higher carbon residues. As will be shown herein, an increase in solvent-to-oil ratio during deasphalting at the same overhead temperature of both high and low viscosity residua produces a deasphalted oil of increased carbon residue. Therefore, it is unexpected to find that the subsequent application of certain extraction, dewaxing and clay treating steps which are known to produce only proportional decreases in carbon residue, when applied to high viscosity residua (viscosities over 1800 SUS at 210° F.) which have been mildly deasphalted, using increased solvent-to-oil ratios, produces finished bright stocks having the desired viscosities and viscosity indexes and also having a carbon residue as low as or lower than the deasphalted and finished oils of the same viscosity and V.I. produced from lighter, lower viscosity vacuum residua by conventional prior art methods.

It becomes, therefore, an object of this invention to provide a new method for the manufacture of low carbon residue, high V.I., lubricating oil stocks from residual oils containing lubricating oil constituents.

Another object of the invention is to provide a method for the manufacture of bright stocks from vacuum residua by processing the residua to a higher viscosity during distillation, mildly deasphalting the residua so produced, and producing therefrom on subsequent refining under specified conditions, bright stock which has an unexpectedly low carbon residue number.

Still another object of the invention is to provide a method of increasing the efficiency of lubricating oil refining operations as regards the reduction of carbon residue number and increased viscosity index.

A fourth object of the invention is to provide a lubricating oil bright stock of low carbon residue number and increased viscosity index using certain specified refining conditions.

Other objects and advantages of the invention will become apparent as the description thereof proceeds.

In the process of manufacturing lubricating oils from petroleum residua containing valuable lubricating constituents, it is common practice to subject the oils to various refining treatments in order to improve the viscosity index, low temperature fluidity, and oxidation stability by removing deleterious or undesirable hydrocarbons and other compounds from the oils. Residual fractions when so processed produce "bright stocks," and the invention will be demonstrated, but is not limited, by reference to bright stock manufacture since therein the problem of carbon residue content is especially prevalent. Normally, in preparing bright stocks the object is to produce a lubricating oil of a particular viscosity, say between about 150 to 160 SUS at 210° F. To obtain this result, it is customary procedure to first make a vacuum residuum having a viscosity of 800 to 1300 SUS at 210° F., and then subject it to various deasphalting, solvent refining, dewaxing, and clay treating methods to produce a finished bright stock of the desired viscosity and viscosity index. Adjustment of conditions, such as solvent-to-oil ratios, temperatures, and time, allow the attainment of a finished bright stock tailored to the refiner's blending needs. Because of the peculiar, complex nature of the residual hydrocarbons present in bright stocks, it is not feasible to process them to viscosities much lower than about 120 SUS or higher than about 180 SUS at 210° F. because the blending characteristics may be disadvantageously affected. The invention is, therefore, particularly directed to treating heavy residua containing valuable lubricating oil constituents.

We have found, for example, that the lowest carbon residue and highest viscosity index obtainable for a 150 viscosity, finished bright stock from East Texas crude can be obtained by processing a 3800 vis. vacuum residuum using an 8-1 propane to oil ratio, a 160° F. deasphalter overhead temperature at 445 p.s.i.g., and 4.5-1 phenol-to-oil ratio, said phenol containing 2% phenolic water. The properties of this bright stock include a V.I. of 101, a 0° F. pour point, and a viscosity of 152 SUS at 210° F. In order to produce a bright stock of equivalent carbon residue and V.I. from a lower viscosity residuum, it would be necessary to sacrifice the viscosity of the bright stock.

In order to demonstrate the invention, the following experiments are described:

A topped crude oil having the following characteristics: gravity (°API), 19.7; flash, 390° F.; pour point, +25° F.; viscosity (SUS at 210° F.), 100.1; color (NPA), black; with a boiling range of:

| Vol. Percent | I.B.P. | 2.5 | 50 | 10 | 20 | 30 | 40 |
|---|---|---|---|---|---|---|---|
| ° F | 520 | 557 | 560 | 497 | 655 | 692 | 733 | was treated to vacuum distillation in a tower operated at a flash zone temperature of about 705° F. under absolute pressure of 90 mm mercury with steam in an amount of about 0.7 lb./bbl. of charge oil to produce a 1300 vis. residuum. The same topped crude was subjected to vacuum distillation in a tower operated at a reduced pressure of 51.0 mm. mercury, a flash zone temperature of 709° F. with 3.7 lbs. steam/bbl. oil to produce a 2600 vis. residuum. A third sample of the topped crude was subjected to vacuum distillation in a tower operated at a reduced pressure of 51.0 mm. mercury, and flash zone temperature of 713° F., with 7.3 lbs. steam/bbl. oil to produce a 4000 vis. residuum. The physical characteristics of these residua are set forth in the following table:

TABLE I

| Physical property | 1,300 vis. resid. | 2,600 vis. res. | 4,000 vis. res. |
|---|---|---|---|
| Gravity, ° API | 12.6 | 11.1 | 9.8 |
| Flash, ° F | 575 | 605 | 620 |
| Vis., SUS, at 210° F | 1,300 | 2,612 | 3,969 |
| Color, NPA | Black | Black | Black |
| Carbon residue (Conradson), weight percent | 13.5 | 17.7 | 19.5 |

A sequence of experimental runs using the residua of Table I was made in which four independent process variables were employed in the following ranges:

(1) Deasphalter overhead temperature: 140° F. to 160° F.

(2) Propane to oil ratio: 6:1 to 10:1 by vol.

(3) Phenol ratio: 2.5:1 to 4.5:1 by vol.

(4) Percent phenolic water[1]: 2 to 10% (based on phenol).

These process variables, considered to be the most important were adjusted to include low, intermediate and high levels in the various runs, the combinations of levels of the variables being carefully chosen so as to permit ready interpretation and extension of the data so obtained through graphical analysis to outline the minimum number of experiments required. Product quality factors, such as viscosity at 210° F., V.I., pour point, color, acid number, flash point, steam emulsion number, demulsibility, Conradson carbon residue, etc., were determined. The steps of dewaxing and clay contacting are considered to be finishing operations only, and unimportant as far as the end results are concerned. The various residua, prepared by vacuum distillation, were subsequently subjected to deasphalting, using a solvent composition comprising 3% ethane, 94% propane and 3% butane. A pilot plant deasphalting unit, consisting of a conventional treating tower, packed with Berl saddles, and product and treating solution recovery means was used. The propane feed temperature was 25° F. lower than the tower overhead temperature in each run, and the main propane stream was introduced into the treating tower through an inlet near the bottom of the tower. The tower was operated so that the charge-oil temperature at the tower inlet was equal to the tower ---
[1] Phenolic water is defined as an azeotropic mixture of phenol and water boiling at about 210° F. and containing 10% phenol.

overhead temperature, and the charge-oil, diluted with an equal volume of the above-described solvent, was introduced through an upper, charge inlet.

The phenol extraction processing was carried out in a conventional treating tower under the following temperature conditions:

| | °F. |
|---|---|
| Overhead temperature | 204 |
| Bottom temperature | 192 |
| Phenol at tower inlet | 204 |
| Charge-oil at tower inlet | 192 |
| Phenolic water at lower inlet | 84 |

The dewaxing steps were conducted using a solvent comprising 47.5% by volume of methyl ethyl ketone and 52.5% by volume of toluene, in a 5 to 1 solvent-to-oil ratio by volume. The filtering temperature was —14° F., and a 1:1 by volume solvent-to-oil wash-ratio was used. The finishing step of clay contacting was carried out using 12 lbs. of Filtrol X–466 clay per barrel of oil, at 500° F. contact temperature.

Table II lists the operating conditions used and the properties of the deasphalted oils, the raffinates, and the finished bright stocks which were produced.

quired only a relatively small number of experimental observations instead of the large number of actual observations which would have been required to analyze a problem of this magnitude if three levels of each variable were employed in combination with three levels of every other variable. This type of data analysis is advantageous over the two-level factorial analysis in that a definite establishment of the relationship of the variables at intermediate levels can be obtained with only a small number of additional experiments.

The graphical analysis referred to in the foregoing comprised showing viscosity (SUS at 210° F.), Conradson carbon residue, and viscosity index of products as functions of the viscosity (SUS at 210° F.) of the vacuum residuum, with the deasphalter propane-to-oil ratio as a parameter at different levels of deasphalter overhead temperature, phenol-to-oil ratio, and percent phenolic water. By such procedure, it was possible to confirm and extend the experimental discovery that the viscosity index of the finished bright stock increases as the vacuum residuum viscosity increases and as the propane-to-oil ratio decreases, and to determine optimum conditions from analysis showing that the viscosity index increases as the deasphalter overhead temperature decreases, as the

TABLE II

*Properties of, and conditions used to produce, the deasphalted oil, residuum raffinate, and finished bright stock*

| Run No. | Resid. vis., 210° | D.A. unit opr. cond. | | DAO produced | | Phenol unit opr. cond. | | R.R. prod. | | Finished bright stock | | | | | | | |
|---|---|---|---|---|---|---|---|---|---|---|---|---|---|---|---|---|---|
| | | Propane ratio | Ovh'd temp., deg. | Vis., 210° | Con. C.R. | Phenol ratio | Percent phenolic water | Vis., 210° | Con. C.R. | Vis. | C.R. | Pour | V.I. | S.E. No. | Demul. | 1948 N.N. | C.O.C. flash |
| 1 | | | | | | 2.5-1 | 2.1 | 110.0 | .35 | 119.2 | .26 | 0 | 98.5 | 370 | 20 | .03 | 540 |
| 2 | | | | | | | 6.0 | 110.0 | .42 | 119.2 | .32 | 0 | 98.2 | 220 | 12 | .03 | |
| 3 | | | | | | | 10.0 | 110.9 | .47 | 119.3 | .36 | −5 | 97.5 | 319 | 23 | .03 | 550 |
| 4 | | 6-1 | 160 | 131.0 | 1.46 | 3.6-1 | 2.0 | 108.9 | .26 | 117.3 | .23 | 0 | 100.6 | 100 | 13 | .03 | 550 |
| 5 | | | (445#) | | | | 2.0 | 106.8 | .23 | 114.5 | .21 | 5 | 101.5 | 105 | 30 | .03 | |
| 6 | | | | | | 4.5-1 | 6.0 | 106.1 | .29 | 114.5 | .23 | 5 | 101.0 | 375 | 24 | .03 | |
| 7 | | | | | | | 10.0 | 106.4 | .24 | 114.5 | .24 | 10 | 99.9 | 325 | 30+ | .03 | |
| 8 | | 6-1 | 150 | 144.6 | 1.66 | 2.5-1 | 2.0 | 116.0 | .38 | 127.5 | .39 | −5 | 98.9 | 647 | 30+ | .03 | 535 |
| 9 | | | | | | | 2.0 | 114.7 | .35 | 127.5 | .33 | 5 | 97.3 | 378 | 25 | .03 | |
| 10 | | 10-1 | 160 | 145.3 | 1.70 | 2.6-1 | 10.0 | 118.0 | .38 | 127.5 | .43 | 0 | 96.3 | 209 | 3 | .03 | |
| 11 | | | | | | | 2.0 | 114.8 | .24 | 123.3 | .27 | 0 | 100.3 | 244 | 30+ | .03 | |
| 12 | 1,300 | | | | | 4.6-1 | 10.0 | 114.3 | .26 | 123.5 | .29 | 5 | 98.7 | 219 | 4 | .03 | |
| 13 | | | | | | | 2.1 | 127.3 | .62 | 139.0 | .50 | 0 | 99.2 | 250 | 30 | .04 | |
| 14 | | | | | | 2.5-1 | 6.2 | 127.8 | .63 | 139.0 | .52 | 5 | 98.9 | 385 | 28 | | 550 |
| 15 | | | | | | | 10.0 | 129.1 | .68 | 139.5 | .55 | 0 | 98.2 | 285 | 30+ | .06 | 550 |
| 16 | | 6-1 | 140 | 161.3 | 1.90 | 3.4-1 | 2.0 | 127.7 | .44 | 137.6 | .46 | 0 | 101.2 | 215 | 30+ | .03 | 540 |
| 17 | | | (350#) | | | | 2.3 | 126.4 | .42 | 134.0 | .42 | 10 | 102.2 | 610 | 30+ | .03 | |
| 18 | | | | | | 4.5-1 | 6.0 | 126.8 | .40 | 134.0 | .43 | 10 | 101.9 | 240 | 28 | .03 | |
| 19 | | | | | | | 10.0 | 126.3 | .47 | 133.0 | .45 | 0 | 101.3 | 40 | 25 | .03 | |
| 20 | | 8-1 | 140 | 167.4 | 2.02 | 2.6-1 | 2.0 | 129.3 | .51 | 144.0 | .55 | −5 | 98.7 | 300 | 30+ | .03 | |
| 21 | | | | | | | 2.0 | 132.5 | .57 | 147.0 | .59 | 0 | 97.8 | 400 | 30 | .03 | |
| 22 | | 10-1 | 140 | 170.0 | 2.05 | 2.5-1 | 10.0 | 133.5 | .65 | 147.0 | .65 | −10 | 96.8 | 550 | 30 | .09 | |
| 23 | | | | | | | 2.1 | 130.8 | .45 | 142.5 | .47 | 0 | 100.8 | 375 | 30+ | .03 | |
| 24 | | | | | | 4.6-1 | 10.7 | 129.7 | .49 | 143.0 | .50 | −5 | 99.9 | 330 | 30+ | .04 | |
| 25 | 2,600 | 6-1 | 140 | 176.4 | 2.17 | 2.6-1 | 2.1 | 138.8 | .61 | 154.0 | .58 | 0 | 99.6 | 560 | 30+ | .05 | |
| 26 | | | | | | | 2.0 | 129.9 | .52 | 141.3 | .44 | 5 | 99.3 | 360 | | .03 | |
| 27 | | | | | | 2.6-1 | 9.9 | 132.2 | .50 | 142.6 | .50 | 5 | 98.3 | 320 | | .03 | 555 |
| 28 | | 6-1 | 160 | 153.2 | 1.40 | | 2.1 | 130.8 | .39 | 138.1 | .33 | 0 | 102.3 | 480 | | .03 | |
| 29 | | | | | | 4.6-1 | 9.9 | 130.5 | .53 | 139.4 | .40 | 0 | 100.7 | 360 | | .03 | |
| 30 | | | | | | | 2.1 | 147.5 | .64 | 157.2 | .52 | 5 | 98.3 | 450 | | | 590 |
| 31 | | 10-1 | 160 | 176.0 | 1.60 | 2.6-1 | 10.0 | 153.5 | .78 | 158.3 | .67 | 0 | 97.3 | 390 | | | 550 |
| 32 | | | | | | | 2.0 | 147.7 | .46 | 154.0 | .43 | 0 | 101.3 | 600 | | | 580 |
| 33 | 4,000 | | | | | 4.6-1 | 10.0 | 149.2 | .48 | 154.8 | .56 | 5 | 99.8 | 600 | | | 600 |
| 34 | | | | | | | 2.0 | 148.8 | .60 | 171.3 | .67 | −5 | 100.0 | 635 | 30 | .03 | 575 |
| 35 | | 6-1 | 140 | 188.0 | 1.85 | 2.6-1 | 10.1 | 151.9 | .65 | 172.0 | .75 | −5 | 99.0 | 840 | 30+ | .06 | 590 |
| 36 | | | | | | | 2.0 | 145.0 | .39 | 168.3 | .58 | −5 | 103.0 | 600 | 21 | .03 | 595 |
| 37 | | | | | | 4.6-1 | 10.0 | 146.4 | .55 | 169.3 | .63 | −5 | 102.2 | 720 | 30+ | .03 | 590 |
| 38 | | | | | | | 2.0 | 164.7 | .78 | 186.3 | .94 | 0 | 98.5 | 420 | | | 585 |
| 39 | | 10-1 | 140 | 206.0 | 2.75 | 2.6-1 | 10.4 | 168.6 | 1.09 | 187.0 | 1.01 | 0 | 97.5 | 540 | | | 550 |
| 40 | | | | | | | 2.1 | 164.8 | | 183.0 | .86 | 0 | 101.5 | 420 | | | 565 |
| 41 | | | | | | 4.6-1 | 10.4 | 165.7 | .87 | 184.0 | .90 | 0 | 100.6 | 540 | | | 570 |

The results shown in Table II were subjected to graphical analysis by a method of cross-plotting and interpolating the data, obtained at carefully selected operating condition levels, to show the effects of the above-mentioned process variables on the properties of the products. This method revealed particular levels of the various process variables (i.e. operating conditions) which lead to the most desirable qualities in the bright stock, and rephenol-to-oil ratio increases, and as the percent phenolic water decreases.

Also, the viscosity of the finished bright stock was found to increase as the vacuum residuum viscosity increases, as the propane ratio increases, as the percent phenolic water increases, as the deasphalter overhead temperature decreases, and as the phenol ratio decreases.

Lastly, it was found that the carbon residue improves, or decreases, as the vacuum residuum viscosity increases, the propane ratio decreases, and the percent phenolic water decreases. Also, the carbon residue improves as the deasphalter overhead temperature increases and the phenol ratio increases.

Figure 1:
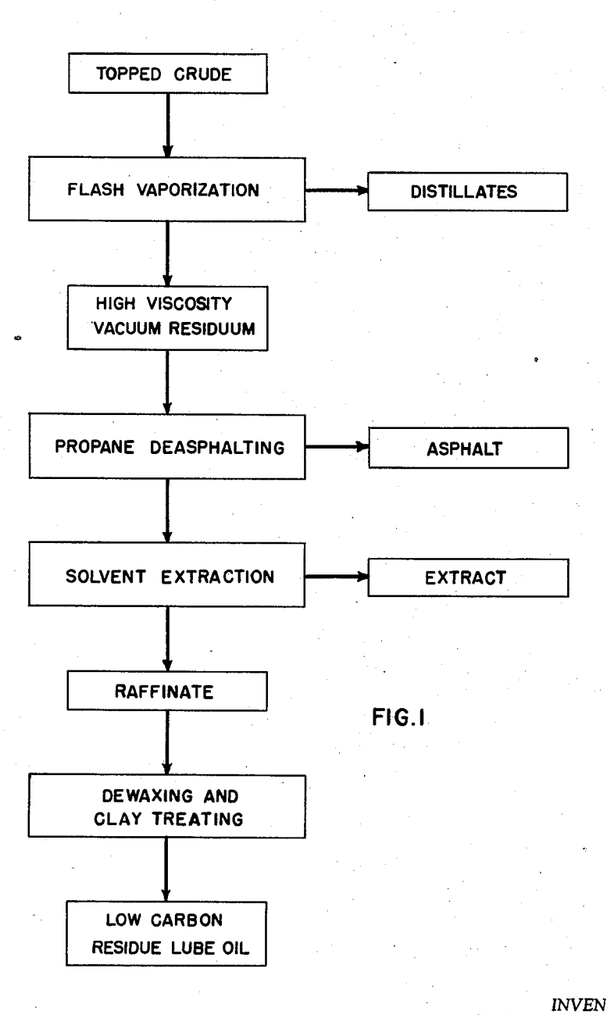
Figure 1 is a simplified block diagram showing the general steps of the process and the products produced.
Figure 1A:
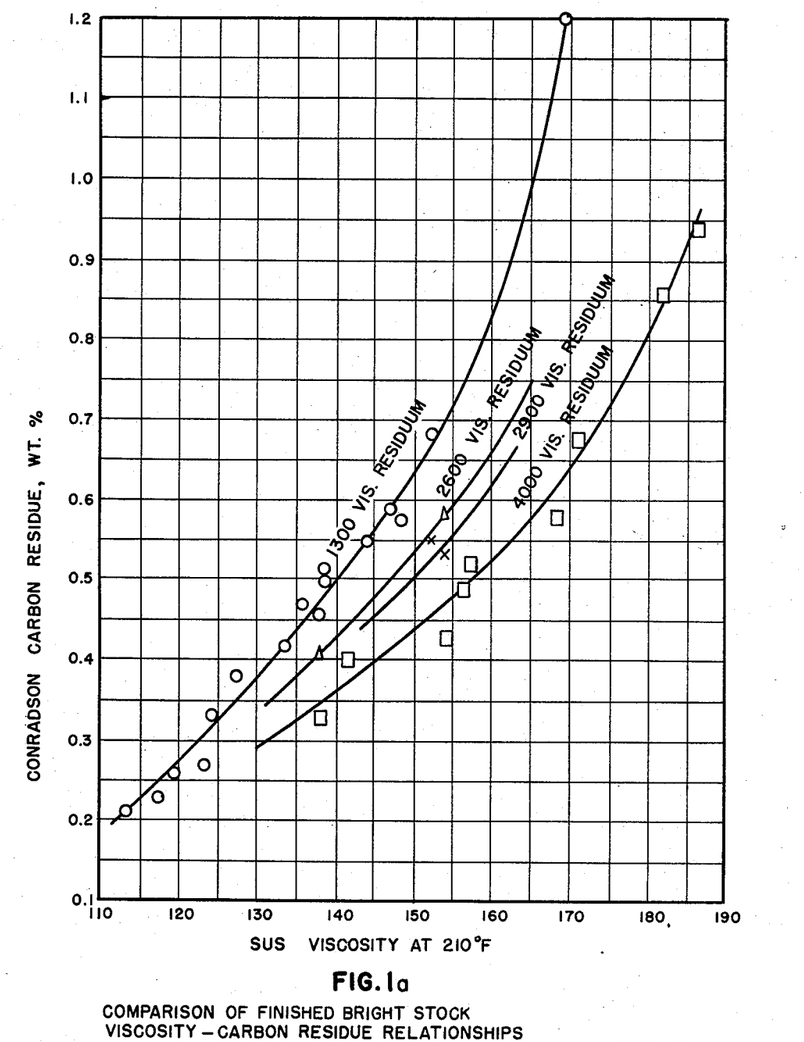
Figure 1a is a graphical plot of viscosity (SUS at 210° F.) as abscissa against Conradson carbon residue (wt. percent) as ordinates for finished bright stocks prepared from vacuum residua of different viscosities.
Figure 7:
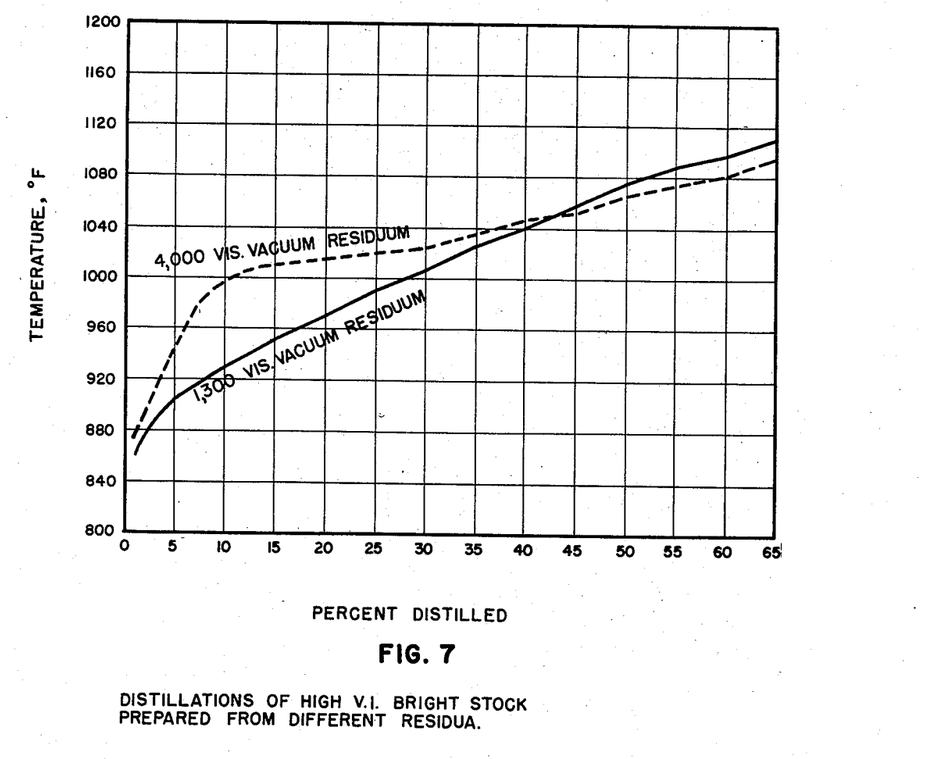
Figure 7 is a distillation curve of high viscosity index bright stocks from different viscosity vacuum residua.

The results of this analysis are presented in graphic form in Figure 1a which shows that for bright stocks processed to a given viscosity, the oils with the lowest carbon residues are produced from the highest vacuum residua. Figure 7 shows the improvement in width of boiling range of oils produced from higher vacuum residua, that is to say, the bright stocks produced from the higher viscosity residua possess a narrower boiling range which in turn means higher performance quality. It is generally known and agreed that bright stocks of narrower boiling range perform more satisfactorily in modern automobile engines, which result is attainable by this invention.

Figure 2:
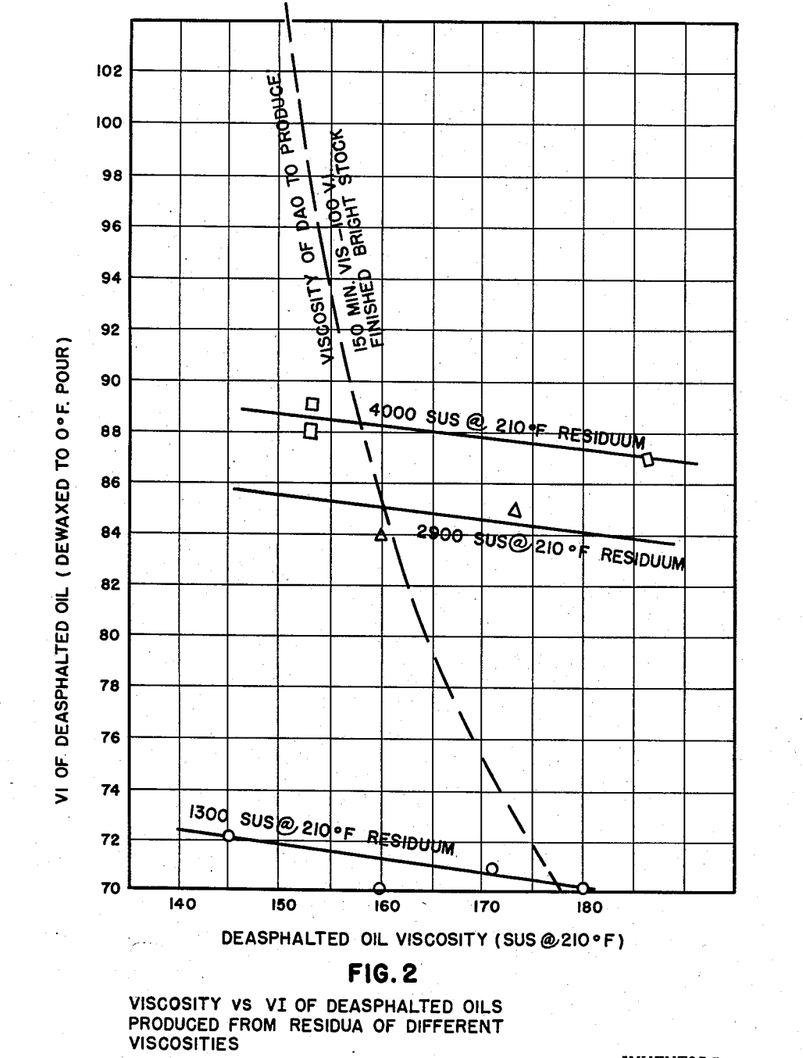
Figure 2 is a graphical plot of viscosity (SUS at 210° F.) against viscosity index for deasphalted oils from various residua.
Figure 3:
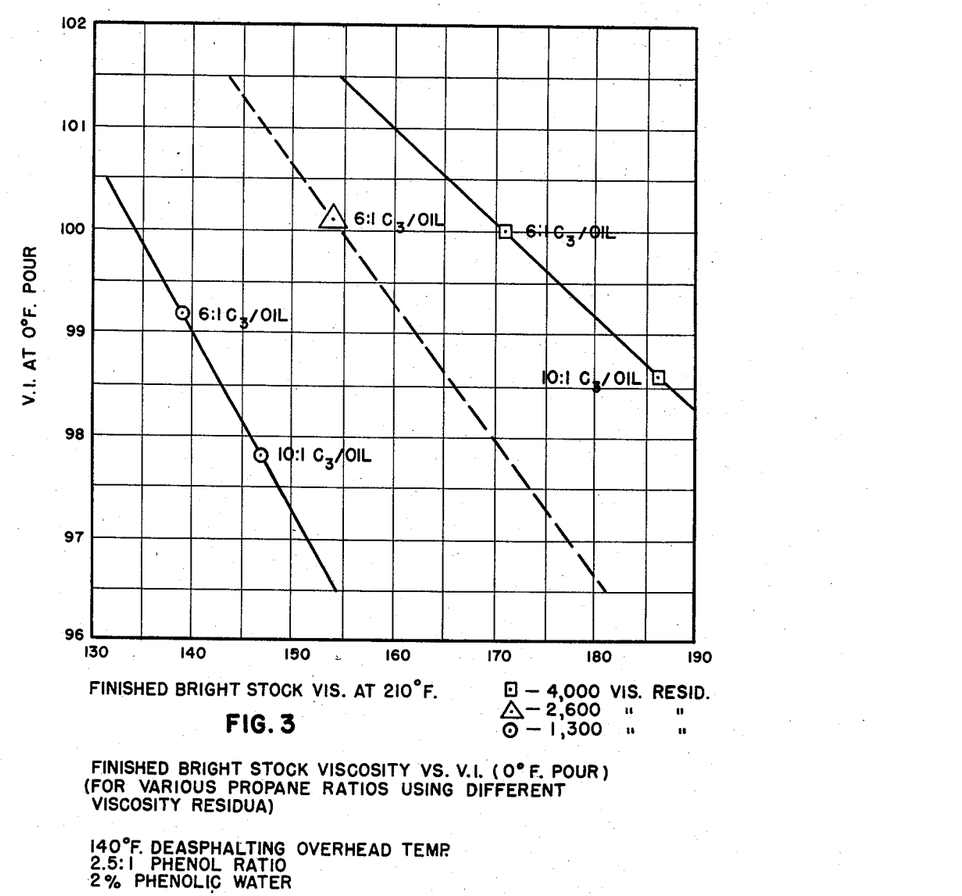
Figure 3 is a graphical plot of viscosity (SUS at 210° F.) against viscosity index at 0° F. pour point for finished bright stocks prepared from different viscosity residua using various propane-to-oil ratios for deasphalting.
Figure 4:
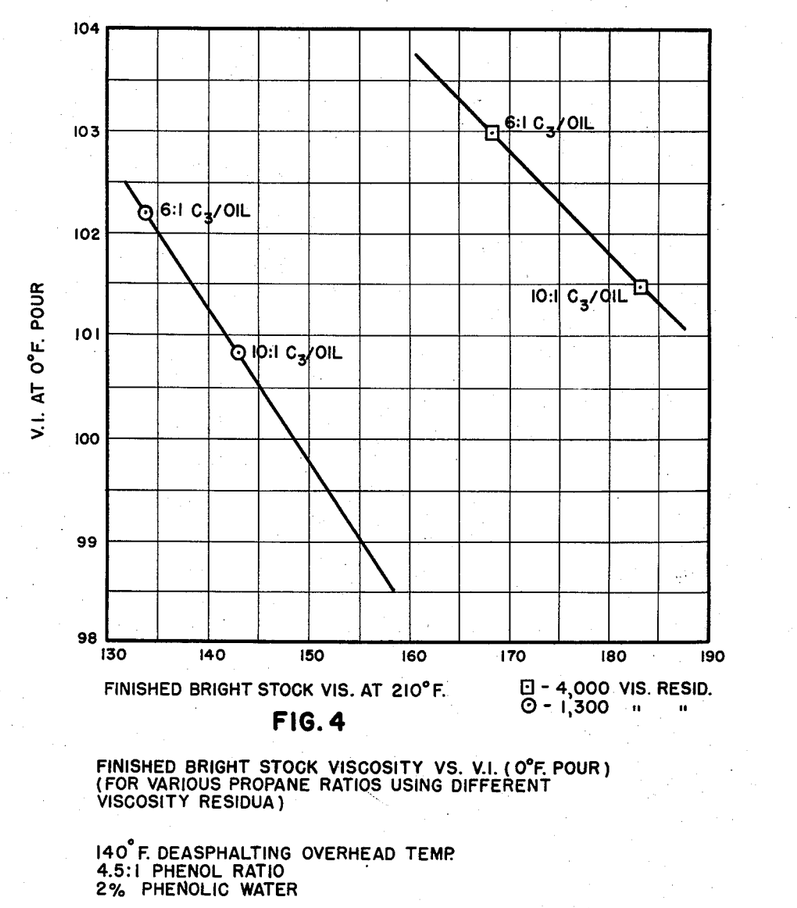
Figure 4 is another graphical plot of viscosity (SUS at 210° F.) against viscosity index at 0° F. pour point for finished bright stocks prepared from different viscosity residua using various propane-to-oil ratios for deasphalting.
Figure 5:
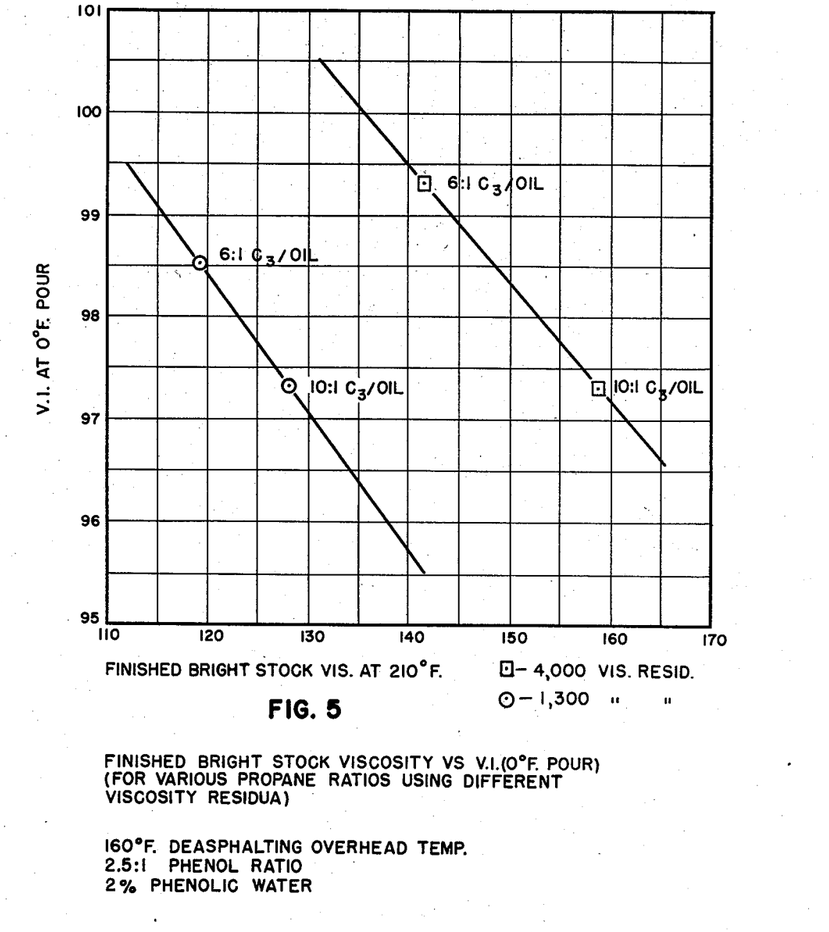
Figure 5 is still another graphical plot of viscosity (SUS at 210° F.) against viscosity index at 0° F. pour point for finished bright stocks prepared from different viscosity residua using various propane-to-oil ratios for deasphalting.
Figure 6:
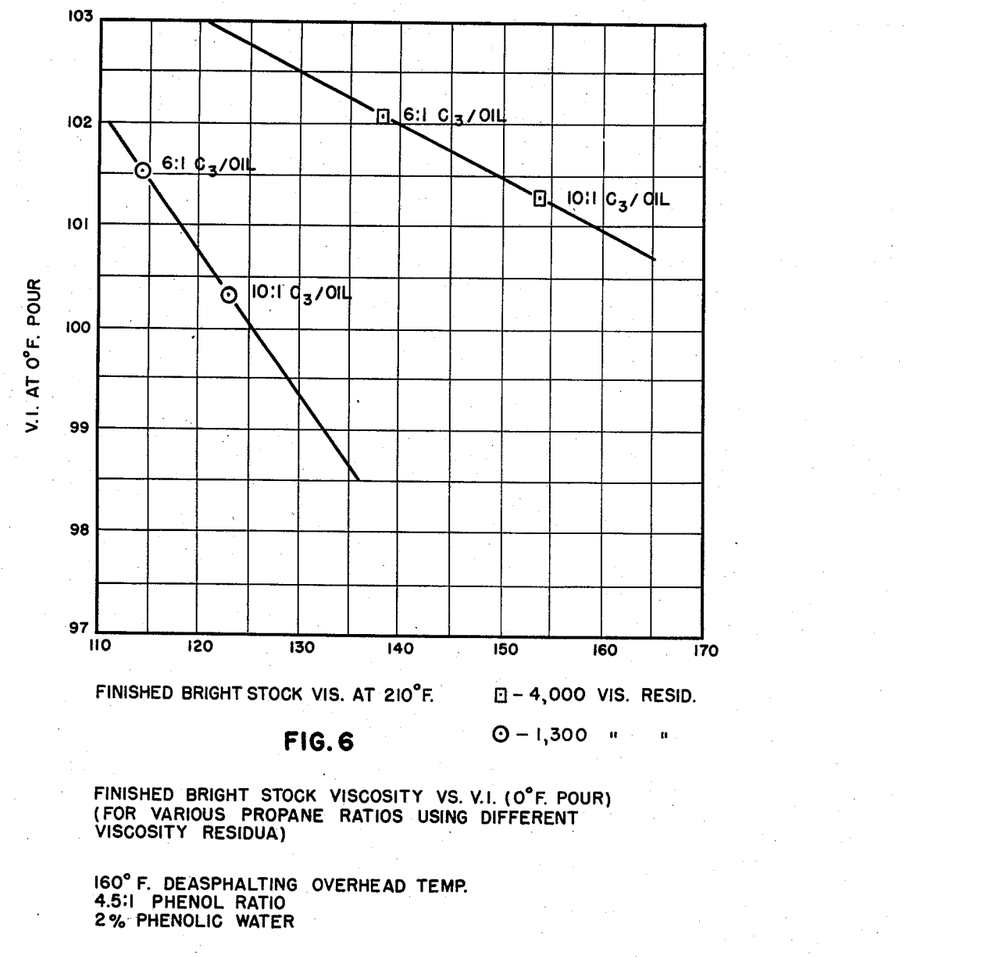
Figure 6 is another graphical plot of viscosity (SUS at 210° F.) against viscosity index at 0° F. pour point for finished bright stocks prepared from different viscosity residua using various propane-to-oil ratios for deasphalting.

Figure 2 shows the V.I. superiority of deasphalted and dewaxed lubricating oil fractions produced from high viscosity vacuum residua. The broken-line curve shows the deasphalted oil viscosities required to produce a 150 (minimum) viscosity — 100 V.I. finished bright stock from vacuum residua of various viscosities. From Figure 2 it will be observed that for a deasphalted oil of a given viscosity, the V.I. increases as the viscosity of the residuum from which it is produced increases. Although the invention is not to be limited to any theories that may be advanced, this V.I. improvement may be attributed to improved selectivity of the propane as a result of charging a residuum of higher and narrower boiling range to the deasphalting process. Figures 3 through 6 show the V.I. superiority of the extracted and finished bright stocks from these deasphalted, high-viscosity, vacuum residua.

The invention can be further demonstrated by the following example:

EXAMPLE 1

Separate portions of the East Texas crude, heretofore referred to, having an API gravity of 19.7 and a viscosity at 210° F. of 100.1 SUS, were processed to yield a first vacuum residuum having a viscosity of 1300 SUS at 210° F. and a second vacuum residuum having a viscosity of 2450 SUS at 210° F. The 1300 vis. residuum had a carbon residue of 13.5 wt. percent. The second vacuum residuum had a carbon residue of 16.0 wt. percent. The first vacuum residuum was deasphalted using a 6/1 propane-to-oil ratio, and a temperature gradient of 150° F. to 115° F. from top to bottom of the tower, operated at 450 p.s.i.g., to produce a deasphalted oil having an API gravity of 22.4°; vis. at 210° F., 160 SUS; color NPA, +6; and a carbon residue of 1.80 wt. percent. This deasphalted oil was extracted with phenol using a 3.5/1 solvent-to-oil ratio in a tower having a temperature gradient of 204° F. to 192° F. from top to bottom. The raffinate was dewaxed to a 0° F. pour point and contacted with 10 lbs./bbl. of clay to produce a finished bright stock having an API gravity of 27.4, a viscosity at 210° F. of 133 SUS, a V.I. of 100; a 0° F. pour point, and a carbon residue of 0.44. The second residuum (2450 vis.) was treated to deasphalting under the same conditions to produce a deasphalted oil having an API gravity of 22.8°, a pour point of 95° F., a viscosity at 210° F. of 165 SUS, and carbon residue of 1.65 wt. percent. This deasphalted oil was extracted, dewaxed and clay treated in the same manner as the deasphalted oil from the 1300 vis. residuum and produced a finished bright stock having an API gravity of 26.6°; 0° F. pour point; viscosity at 210° F., 150.3; V.I. of 99; and a carbon residue of 0.49 wt. percent.

It is seen from this example that by increasing the viscosity (at 210° F.) of a residuum by means of vacuum distillation to 2450 SUS viscosity instead of 1300 SUS, a deasphalted oil was produced having a higher viscosity (165 SUS vs. 160 SUS) while the carbon residue of the deasphalted oil was reduced from 1.80 to 1.65 wt. percent, and a finished oil of about 17 SUS viscosity units higher (150.3 vs. 133 SUS) but approximately the same carbon residue (0.44 vs. 0.49 wt. percent) was produced.

EXAMPLE 2

A portion of the 2450 vis. residuum described in Example 1 was deasphalted under the same conditions but using a propane-to-oil ratio of 8/1. This is mild deasphalting as meant by this invention. A deasphalted oil of higher viscosity, 180 SUS at 210° F., and having an API gravity of 22.3°, a 95° F. pour point, color (NPA) of 5, and a carbon residue of 1.70 wt. percent was produced. Comparing this deasphalted oil with the deasphalted oil produced from the 2450 vis. residuum of Example 1 reveals that raising the propane-to-oil ratio from 6/1 to 8/1 caused the viscosity at 210° F. to increase about 15 units (180 vs. 165) with only a slight increase in carbon residue (1.70 vs. 1.65 wt. percent).

The effects of processing a conventional 1300 vis. residuum using a high propane-to-oil ratio, that is mild treatment, followed by solvent extraction and finishing under the same standard conditions, and processing a high viscosity residuum (3815 SUS vis. at 210° F.) using more severe deasphalting (6/1 propane-to-oil ratio) followed by the same finishing conditions are shown in Table III.

From Table III it is seen that an unexpectedly large decrease in the carbon residue is obtained by vacuum distillation to a high viscosity residiuum followed by the ordinary lubricating oil refining steps. Although it may be possible to process the 1300 vis. vacuum residuum to a product having a low carbon residue by increasing the severity of the treatment, the product would not qualify as a bright stock and would have a much lower viscosity. The treatment set forth in Table III was directed to the preparation of a bright stock having about a 150 vis. at 210° F.

It is thus seen that the invention not only accomplishes the results of increasing the production of neutral oils by allowing the processing of the residua to higher viscosities, but also overcomes the problem of the increased carbon residue which is normally experienced in producing bright stocks from high viscosity residua as a result of the more severe distillation. The invention is, therefore, directed broadly to producing finished residual lubricating oils having improved viscosity index, improved color, flash point, etc., and reduced carbon residue by processing the residua to higher viscosities during the vacuum distillation step and treating the resulting high viscosity residua to mild deasphalting conditions followed by conventional extraction and clay finishing.

The results of this invention are experienced when the residua are processed to viscosities of above about 1800 SUS at 210° F. to about 5000 SUS at 210° F. The residua may be distilled to viscosities higher than 5000 SUS but some loss in yield is encountered. Within the range of about 1800 viscosity to 5000 viscosity for the residua, the actual overall yield loss is very small since the distilled portion of the residual oil is refined to increased yields of finished heavy neutral oil.

A reduced crude or other residual stock having an initial boiling point of about 500° F. to 530° F. which distills off about 40 percent at 700° F. to 750° F., can be successfully vacuum distilled to this high viscosity by using a flash zone temperature of about 645° F. to 705° F. and increasing the vacuum to about 40 to 50 mm. of mercury. In some instances it may be desirable to operate at lower temperatures using a higher vacuum or, providing the nature of the crude permits, the distillation can be carried out at higher temperatures under about 60 mm. of mercury pressure as long as the conditions are adjusted so that a residue is obtained having

TABLE III

*Comparison of high and low viscosity vacuum residua*

| Feed: | | | | | | | |
|---|---|---|---|---|---|---|---|
| Flash, °F | 390. | | | | | | |
| Gravity, ° API | 19.7. | | | | | | |
| Pour point | +25. | | | | | | |
| Vis., SUS, at 210° F | 100.1. | | | | | | |
| Color | Black. | | | | | | |
| Atmospheric boiling range— | | | | | | | |
| Vol. percent distilled | I.B.P. | 2.5 | 5.0 | 10.0 | 20.0 | 30.0 | 40.0 |
| ° F | 520 | 557 | 560 | 597 | 655 | 692 | 733 |

| | Low vis. residue | High vis. residue |
|---|---|---|
| Flash conditions: | | |
| Temperature, ° F | 705 | 692 |
| Pressure mm., Hg | 130 | 45 |
| Equivalent temp. at 5 mm. Hg, ° F | 561 | 608 |
| Vacuum residuum: | | |
| Yield, vol. percent of crude | 48 | 36.7 |
| Gravity, ° API | 12.6 | 10.6 |
| Vis., SUS, at 210° F | 1,300 | 3,815 |
| (Conradson) carbon residue, percent W | 13.0 | 19.0 |
| Propane deasphalting: | | |
| Propane/oil ratio | 10-1 | 6-1 |
| Temperature, ° F | 145-114 | 150-115 |
| Deasphalted oil: | | |
| Yield, vol. percent of residuum | 61 | 42 |
| Gravity, ° API | 21.7 | 22.4 |
| Vis., SUS, at 210° F | 180 | 180 |
| Color, NPA | +7 | +6 |
| (Conradson) carbon residue, percent W | 2.2 | 1.65 |
| Solvent extraction (phenol): | | |
| Phenol/oil ratio | 3.5-1 | 3.5-1 |
| Phenolic water, vol. percent phenol | 5.0 | 5.0 |
| Temperature, ° F | 204-192 | 204-192 |
| Raffinate yield, vol. percent of deasphalted oil | 63 | 66.5 |
| Raffinate oil from extraction: | | |
| Gravity, ° API | 27.2 | 27.3 |
| Color, NPA | 5+ | +4½ |
| Flash, ° F | 575 | 585 |
| Vis., SUS, at 210° F | 139 | 146 |
| (Conradson) carbon residue, percent W | 0.70 | 0.45 |
| Finished bright stock after dewaxing and clay treating: | | |
| Gravity, ° API | 26.6 | 26.8 |
| Color, NPA | +5 | 3½+ |
| Vis., SUS, at 210° F | 151 | 156 |
| (Conradson) carbon residue, percent W | 0.70 | 0.45 |
| Neutralization number (1948) | 0.09 | 0.06 |
| Flash, ° F | 570 | 585 | a viscosity of about 1800 to 5000 SUS at 210° F. Following this, the high viscosity residue is subjected to mild deasphalting as herein defined, dewaxing, and solvent extraction normally applied in lubricating oil manufacture. For these purposes, the known chemical and physical treatments may be applied which are designed to improve the viscosity characteristics, oxidation stability, low temperature fluidity, reduce the sulfur content, neutralization values, and remove deleterious hydrocarbons including aromatics, waxes, and asphalts.

By mild deasphalting conditions as used in this specification and claims is meant using propane-to-oil ratios of above about 7/1 to as high as 10/1 and preferably about 8/1 with overhead temperatures of about 160° F. at pressures above 400 p.s.i.g. and not over about 500 p.s.i.g. Any solvent or precipitant may be used for the deasphalting step with propane being preferred. The composition comprising 94% propane, 3% ethane and 3% butane is particularly satisfactory for the purpose of this invention.

The known processes of solvent treating or liquid-liquid contact may be applied using batch or continuous or countercurrent techniques. The propane deasphalting processes such as described in United States Patent 2,010,008 may be used with propane-to-oil ratios varying from above about 7:1 to 10:1. Settling temperatures of about 120° to 130° F. are optimum.

Similarly, the solvent extraction step may be carried out using other solvents than phenol, as is known in the art, such as sulfur dioxide, furfuryl alcohols, B,B'-dichloroethyl ether and other known solvents characterized by their ability to extract from the oil the deleterious aromatic, cyclic and resinous hydrocarbons to improve the oxidation stability and heat-resistance of the raffinate phase. The techniques set forth in United States Patents 911,553, 1,883,374, 1,860,823 with modern adaptations may be used. A solvent-to-oil ratio of 4.5/1 has been found to be optimum to attain the desired results using an overhead temperature of about 204° F. in the treating tower. The dewaxing step is conducted within the conventional process conditions applied in the art using such solvents as MEK and toluene. Also, the clay filtering step which may be conducted using any suitable natural or synthetic filtering medium, is conducted using treating temperatures, clay-to-oil ratios and either contact or percolation techniques designed to give the best results.

The experiments described herein are to be construed as exemplary only and not as limiting the scope of the invention.

The method would, therefore, include the specific process of preparing high viscosity and low carbon residue lubricating oils from residual lubricating oil fractions by distilling the fractions of lubricating oil under reduced pressure to produce heavy residua having viscosities of about 3800 SUS at 210° F. The heavy residua is deasphalted with propane using a propane-to-oil ratio of 8/1 and an overhead temperature of about 160° F. at 445 p.s.i.g. to produce a deasphalted oil. This product is subjected to phenol extraction using a phenol-to-oil ratio of about 4.5/1 and an overhead temperature in the tower of about 204° F. The phenol will contain about 2% phenolic water. A raffinate is separated from the phenol extract phase and subjected to dewaxing, the solvent comprising about 47.5% by volume of methyl ethyl ketone and 52.5% by volume of toluene. This extraction is carried out using a solvent-to-oil ratio of about 5/1 by volume and a filtering temperature of about —14° F. to produce a dewaxed oil. The dewaxed oil is then finished by clay contacting at about 500° F. and a bright stock separated therefrom having a viscosity index above about 100, a 0° F. pour point and a viscosity at 210° F. of about 150. In this embodiment a mixture comprising 94% of propane, 3% of ethane and 3% of butane may be used in the propane deasphalting step to obtain consistent results.

What is claimed is:

1. The method of producing lubricating oil fractions of high viscosity and high viscosity index, lighter color, higher flash point, low carbon residue, and narrow boiling range from petroleum comprising removing distillable materials under reduced pressure to produce heavy residua having SUS viscosities between about 1800 and 5000 SUS, subjecting said heavy residua to mild deasphalting using a propane-to-oil ratio of about 8/1 and an overhead temperature of about 160° F. at 445 p.s.i.g., and further processing the deasphalted oil by extracting, dewaxing and clay contacting under conditions to produce a finished bright stock having a viscosity at 210° F. of about 120 to 180 SUS.

2. The method of producing lubricating oils of high viscosity and low carbon residue from residual lubricating oil fractions comprising removing distillable materials under reduced pressure to produce heavy residua having viscosities of about 3800 SUS at 210° F., subjecting said heavy residua to deasphalting using a propane-to-oil ratio of about 8/1 and an overhead temperature of about 160° F. at 445 p.s.i.g., subjecting the deasphalted oil so produced to phenol extraction using a phenol-to-oil ratio of about 4.5/1, said phenol containing about 2% phenolic water, and recovering as the raffinate a lubricating oil having a viscosity index above about 100, a 0° F. pour point, and a viscosity at 210° F. of about 150.

3. The method of producing lubricating oils of high viscosity and low carbon residue from residual lubricating oil fractions comprising subjecting said fractions to distillation under reduced pressure to produce heavy residua having viscosities of about 3800 SUS at 210° F., subjecting said heavy residua to deasphalting using a propane-to-oil ratio of about 8/1 and an overhead temperature of about 160° F. at 445 p.s.i.g., subjecting the deasphalted oil so produced to phenol extraction using a phenol-to-oil ratio of about 4.5/1 and an overhead temperature of about 204° F., said phenol containing about 2% phenolic water, separating a raffinate oil phase from the phenol extraction process, subjecting the raffinate oil phase to dewaxing using a solvent-to-oil ratio of 5/1 by volume and a filtering temperature of about −14° F., said solvent comprising about 47.5% by volume of methyl ethyl ketone and 52.5% by volume of toluene, contacting the dewaxed oil so produced with clay at 500° F. and separating a finished bright stock having a viscosity index above about 100, a 0° F. pour point and a viscosity at 210° F. of about 150 SUS.

4. The method in accordance with claim 3 in which the propane used in the deasphalting step comprises a mixture of 94% propane, 3% ethane and 3% butane.

5. The method of producing lubricating oil fractions of higher viscosity index, lighter color, higher flash point, and lower carbon residue than can be produced from residua having viscosities up to about 1800 SUS at 210° F. comprising subjecting residual petroleum oils to distillation under reduced pressure to produce heavy residua having viscosities above about 1800 SUS at 210° F., subjecting said heavy residua to deasphalting using a solvent-to-oil ratio of above about 7 to 1 and an overhead temperature of about 160° F. at pressures above atmospheric to produce a deasphalted oil and further processing said deasphalted oil by solvent extracting, dewaxing, and clay contacting under conditions to produce a bright stock having a viscosity at 210° F. of about 120 to 180 SUS.

6. The method in accordance with claim 5 in which the viscosity of said heavy residua is about 1800 to 5000 SUS at 210° F.

7. The method of producing a lubricating oil fraction of higher viscosity index, lighter color, higher flash point, and lower carbon residue than can be produced from residua having viscosities up to about 1800 SUS at 210° F. comprising, subjecting a topped crude oil having essentially the following characteristics: gravity °API, about 19.7; flash, about 390° F.; pour point, about +25° F.; viscosity, SUS at 210° F., 100.1; color, NPA, black; and initial boiling point of about 520° F. to distillation under reduced pressure to produce a heavy residuum having a viscosity of above about 1800 SUS at 210° F., subjecting said heavy residuum to deasphalting with a liquid solvent consisting essentially of propane employing a solvent-to-oil ratio of above about 7 to 1 and an overhead temperature of about 160° F. at pressures above atmospheric to produce a deasphalted oil and further processing said deasphalted oil by solvent extracting, dewaxing, and clay contacting under conditions to produce a lubricating oil fraction having a viscosity at 210° F. of about 120 to 180 SUS.

8. The method of producing a lubricating oil of high viscosity and low carbon residue comprising treating a topped crude oil having an initial boiling point of about 520° F. to vacuum distillation at a flash zone temperature in the range of about 645° F. to 760° F. under absolute pressures between about 45 and 160 mm. mercury in the presence of flash steam up to about 6 pounds per barrel of charge, recovering a vacuum residuum having a viscosity of about 2450 SUS at 210° F. and a carbon residue of about 16.0 weight percent, subjecting the vacuum residuum to propane deasphalting using a propane/oil ratio of about 6:1, recovering a deasphalted oil having a viscosity of about 165 SUS at 210° F. and a carbon residue of about 1.65 weight percent, solvent extracting said deasphalted oil in a tower with a solvent using a solvent-to-oil ratio of about 3.5/1, and a tower temperature ranging from about 204° F. at the top to about 190° F. at the bottom to produce a raffinate dewaxing the raffinate to a 0° F. pour point dewaxed oil, and clay contacting the dewaxed oil to produce a lubricating oil having a viscosity of about 150 SUS at 210° F. and a carbon residue of about 0.49 weight percent.

9. The method of refining a topped crude oil having an initial boiling point of about 520° F. to produce a finished bright stock having a viscosity of about 156 SUS at 210° F. and a lower carbon residue than a bright stock of the same viscosity produced from a vacuum residuum having a viscosity of about 1300 SUS at 210° F., which comprises subjecting said topped crude oil to flash vaporization at about 692° F. under a vacuum of about 45 mm. of mercury to produce about 36.7 volume percent of a vacuum residuum having an API gravity of about 10.6°, a viscosity at 210° F. of about 3815 SUS and a Conradson carbon residue of about 19.0 weight percent, subjecting said vacuum residuum to propane deasphalting in a tower using a propane-to-oil ratio of about 6/1 and a tower temperature ranging from about 150° F. at the top to about 115° F. at the bottom to produce about 42 volume percent, based on the volume of residuum, of deasphalted oil having an API gravity of about 22.4°, a viscosity at 210° F. of about 180 SUS, an NPA color of +6 and a Conradson carbon residue of about 1.65 weight percent, subjecting said deasphalted oil to solvent extraction with phenol using a phenol-to-oil ratio of about 3.5/1, said phenol containing about 5 percent of phenolic water, based on the volume of phenol, said extraction being carried out with a tower temperature ranging from about 204° F. at the top to about 192° F. at the bottom and recovering about 66.5 volume percent, based on deasphalted oil, of a raffinate having an API gravity of about 27.3°, an NPA color of +4½, a flash point of 585° F., a viscosity at 210° F. of 146 SUS and a Conradson carbon residue of 0.45 weight percent, subjecting said raffinate to dewaxing and clay treating to produce a finished bright stock having an API gravity of about 26.8°, an NPA color of 3½, a viscosity at 210° F. of about 156 SUS, a Conradson carbon residue of about 0.45 weight percent and a neutralization number of about 0.06.

10. The method of refining a topped crude oil having an initial boiling point of about 520° F. to produce a finished bright stock which has a lower carbon residue than a bright stock of the same viscosity produced from a vacuum residuum having a viscosity of up to 1800 SUS at 210° F. comprising, subjecting said topped crude oil to flash vaporization under conditions of temperature and vacuum sufficient to produce a vacuum residuum having a viscosity at 210° F. of at least 1800 SUS, subjecting said vacuum residuum to propane deasphalting in a tower using substantially pure propane in a propane-to-oil ratio of about 6/1 and a tower temperature ranging from about 150° F. at the top to about 115° F. at the bottom to produce a deasphalted oil, subjecting said deasphalted oil to solvent extraction in a tower using a solvent-to-oil ratio of about 3.5/1 and a temperature gradient from the tower top to tower bottom of about 204° to 192° F., recovering a raffinate having a lower carbon residue than a raffinate produced from residua having viscosities less than about 1800 SUS at 210° F. dewaxing and clay contacting said raffinate to produce a finished bright stock.

11. The method of refining a topped crude oil having an initial boiling point of about 520° F. to produce a finished bright stock which has a lower carbon residue than a bright stock of the same viscosity produced from a vacuum residuum having a viscosity of up to about 1800 SUS at 210° F., which comprises subjecting said topped crude oil to flash vaporization under conditions of temperature and vacuum sufficient to produce a vacuum residuum having a viscosity at 210° F. of between about 1800 and 5000 SUS, subjecting said vacuum residuum to propane deasphalting in a tower using substantially pure propane in a propane-to-oil ratio of about 6/1 and a tower temperature ranging from about 150° F. at the top to about 115° F. at the bottom to produce a deasphalted oil, subjecting said deasphalted oil to solvent extraction in a tower using a solvent-to-oil ratio of about 3.5/1 and a temperature gradient from the tower top to tower bottom of about 204° to 192° F., recovering a raffinate having a lower carbon residue than a raffinate produced from residua having viscosities less than about 1800 SUS at 210° F., and clay contacting said raffinate to produce said finished bright stock.

References Cited in the file of this patent

UNITED STATES PATENTS

| | | |
|---|---|---|
| 1,944,491 | Bray | Jan. 23, 1924 |
| 1,978,361 | Breiswenger | Oct. 23, 1934 |
| 2,081,174 | Ellis | May 25, 1937 |
| 2,131,205 | Wells et al. | Sept. 27, 1938 |
| 2,143,882 | Keith et al. | Jan. 17, 1939 |
| 2,625,502 | Backlund et al. | Jan. 13, 1953 |
| 2,729,589 | Waghorne et al. | Jan. 3, 1956 |
| 2,738,306 | Pratt et al. | Mar. 13, 1956 |